United States Patent [19]

Veatch et al.

[11] Patent Number: 5,006,258
[45] Date of Patent: Apr. 9, 1991

[54] REGENERATION OF ACIDIC CATIONIC EXCHANGE RESIN USED IN THE REACTIVATION OF SPENT ALKANOLAMINE

[75] Inventors: Fred C. Veatch, Newkirk; Alfred E. Keller, Ponca City, both of Okla.

[73] Assignee: Conoco Inc., Ponca City, Okla.

[21] Appl. No.: 427,417

[22] Filed: Oct. 26, 1989

[51] Int. Cl.$^5$ ............................................. B01D 15/04
[52] U.S. Cl. .................................. 210/677; 210/681; 210/685; 423/228; 423/229; 521/26
[58] Field of Search ............... 210/670, 673, 681, 685, 210/677; 423/228, 229; 521/26

[56] References Cited

U.S. PATENT DOCUMENTS

| 4,076,618 | 2/1978 | Zeblisky | 210/670 |
| 4,172,185 | 10/1979 | Petheram | 521/26 |
| 4,652,352 | 3/1987 | Saieva | 210/670 |
| 4,770,790 | 9/1988 | Oberhofer | 210/673 |

Primary Examiner—Ivars Cintins
Attorney, Agent, or Firm—C. R. Schupbach

[57] ABSTRACT

Spent aqueous alkanolamine solution containing free alkanolamine, alkali metal salts of anions which form heat stable salts with such alkanolamine and heat stable alkanolamine salts is reactivated by contacting the solution with an acidic cation ion exchange resin to remove alkali metal cations and alkanolamine cations resulting from (1) protonation of free alkanolamine with hydrogen on the resin and (2) the alkanolamine salts, followed by eluting the resin with aqueous ammonia to preferentially displace alkanolamine from the resin and thereafter eluting the resin with a dilute mineral acid to displace the ammonia, metal cations and any remaining alkanolamine. The displaced alkanolamine is recovered for reuse. The aqueous ammonia may also be recovered for reuse.

24 Claims, 3 Drawing Sheets

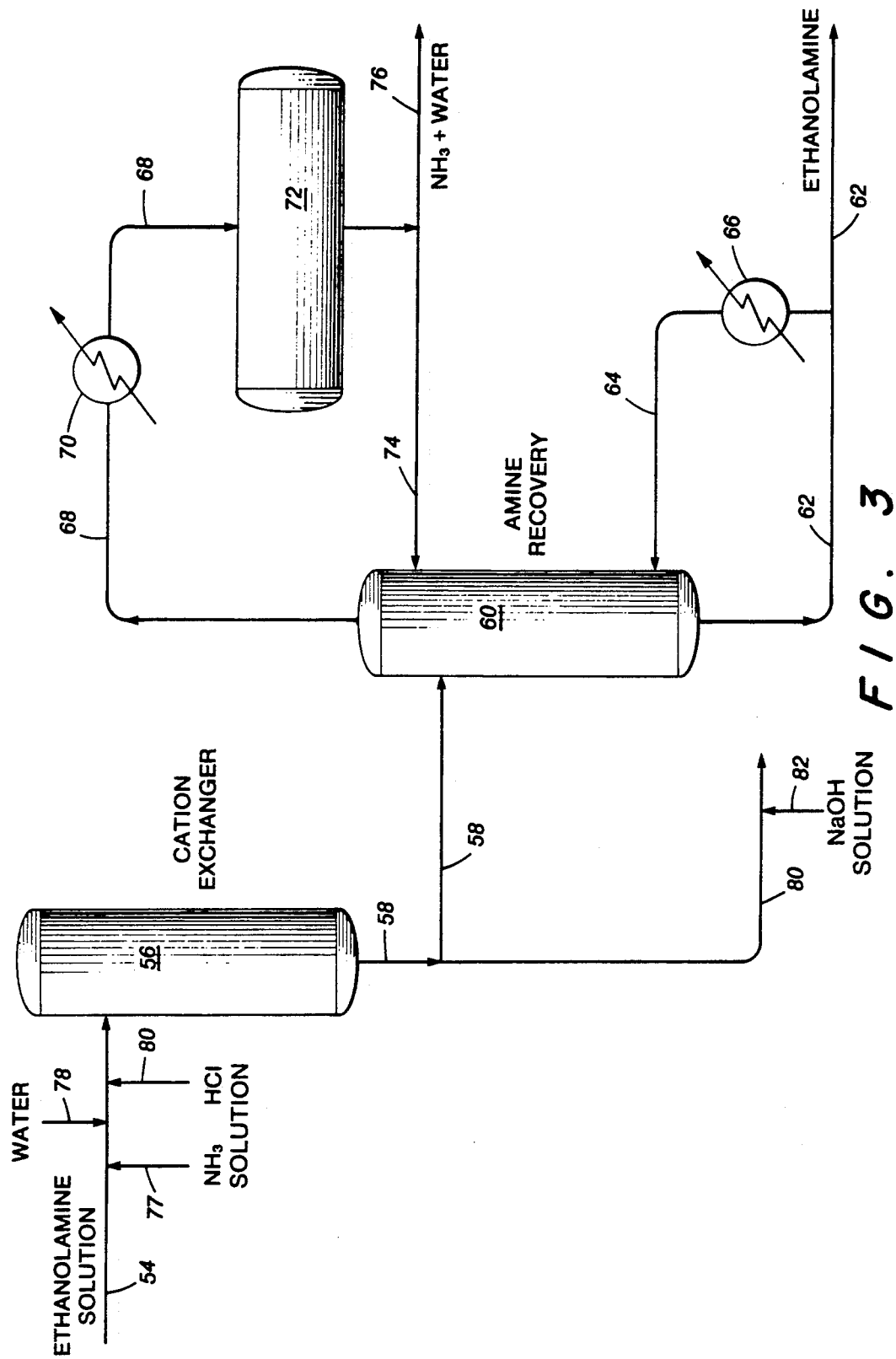

REGENERATION OF ACIDIC CATIONIC EXCHANGE RESIN USED IN THE REACTIVATION OF SPENT ALKANOLAMINE

BACKGROUND OF THE INVENTION

Alkanolamine sweetening units are used for the removal of $H_2S$ and $CO_2$ from natural gases, enhanced oil recovery gases, refinery hydrodesulfurizer recycle gases, FCCU and Coker gas plant tail gases, LPG streams, and Claus sulfur recovery tail gases. The alkanolamines commonly used are ethanolamine, diethanolamine, methyl diethanolamine, diisopropanol amine, and triethanol amine. These compounds are weak bases in water solution. When solutions of alkanolamines are contacted in packed, sieve plate, bubble cap, or valve tray columns with streams containing $H_2S$ and $CO_2$, the $H_2S$ and $CO_2$ dissolve into the alkanolamine solution. The following chemical reactions then take place:

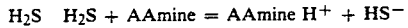

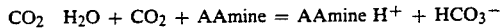

General Eqn.: Acid gases + Alkanolamine = Alkanolamine Salts of Acid Gases

The solution of water, unreacted alkanolamine, and alkanolamine salts are subjected to steam stripping to decompose the alkanolamine salts and remove H S and $CO_2$ from the alkanolamine. The $H_2S$ and $CO_2$ removed from the alkanolamine can then be processed by Claus sulfur recovery, incineration, fertilizer manufacture, or other means.

$H_2S$ and $CO_2$ are not the only gases in the above referred to streams which form weak acids when dissolved in water. Other such acid gases, as they are commonly called, that may appear in gas streams treated with alkanolamine include $SO_2$, COS, or HCN. These gases also undergo the same reactions as $H_2S$ and $CO_2$ to form alkanolamine salts. These salts, though, cannot be removed by steam stripping as are $H_2S$ and $CO_2$ salts. Thus, they remain and accumulate in the system.

Another problem is presented if oxygen gets into the alkanolamine system. Oxidation of acid gas conjugate base anions leads to the formation of other alkanolamine salts, most commonly salts of thiosulfate ($S_2O_3^{-2}$), sulfate ($SO_4^{-2}$), thiocyanate (SCN.). Other inorganic acid anions, such as, chloride ($Cl^-$) may also be present. These salts also cannot be regenerated by steam stripping.

Alkanolamine salts which cannot be heat regenerated, called heat stable salts, reduce the effectiveness of alkanolamine treating. The alkanolamine is protonated and cannot react with either $H_2S$ or $CO_2$ which dissolve into the solution. Also, accumulated alkanolamine salts are known to cause corrosion in carbon steel equipment which is normally used in amine systems. The salts are also known to cause foaming problems which further decreases treating capacity.

The normal procedure used to deprotonate the alkanolamine, so it can react with $H_2S$ and $CO_2$, is to add an alkali metal hydroxide, such as NaOH, to the amine solution. The deprotonated alkanolamine then can be returned to $H_2S$ and $CO_2$ removal service. However, the sodium salts of the anions of the heat stable salts are also heat stable, are difficult to remove and thus accumulate in the alkanolamine solution, with attendant corrosion and foaming problems.

In one process, the alkanolamine solution containing heat stable alkali metal salts is contacted with a basic anion exchange resin to remove the heat stable anions from the solution and thereafter the solution is contacted with an acidic cation exchange resin whereby alkali metal ions are removed from the solution. Anions of any heat stable alkanolamine salts are also removed by the basic anion exchange resin. Removing the heat stable salts in this manner reduces foaming losses. corrosion and maximizes the alkanolamine concentration.

The basic anion exchange resin used in the described process is regenerated by flushing with water to remove free alkanolamines, followed by elution with dilute sodium hydroxide to displace heat stable salt anions with hydroxide ions and a second water wash to remove residual sodium hydroxide and sodium slats. The acidic cation exchange resin is regenerated by flushing with water to remove free alkanolamine, followed by elution with dilute hydrogen chloride to displace sodium cations with hydrogen ions. A second water wash is then used to remove residual hydrogen chloride and sodium chlorides.

In the described process alkanolamine in the alknaolamine solution is protonated by hydrogen at the ionic sites on the acidic cation resin and becomes attached to these sites as alkanolamine cations. When the cation resin is regenerated with the dilute HCl solution, both alkali metal cation and such alkanolamine are displaced from the resin, with hydrogen ions taking their place. The alkanolamine in the regenerant stream cannot be returned to the alkanolamine circulating system for reuse because the alkali metal and chloride ions in the regenerant would recontaminate the system. The resultant loss of alkanolamine is unacceptable both economically and environmentally.

PRIOR ART

U.S. Pat. No. 4,172,185 issued to Petheram relates to a method for regenerating weak base ion exchange resin by passing therethrough a solution at suitable concentration of NaOH, $Na_2CO_3$ ammonia or the like. Then the resin column is rinsed with water to remove regenerant waste products.

U.S. Pat. No. 4,076,618 issued to Zeblisky discloses a method for regenerating ion exchange medium by using a strong alkaline solution such that the regeneration will also result in the removal of complexed metal and complexing agent from the exchange medium. The cation exchange resin is used for separating alkanolamine complexing agent and complexing species of heavy metals from the solution.

U.S. Pat. No. 4,770,790 issued to Oberhofer relates to a process for treatment of contaminated ion exchange resins comprising backwashing the resin by upflowing water, flushing the bed with regenerating chemicals such as surfactants, bio dispersant, etc., and rinsing the bed thoroughly with water prior to placing it back into service.

THE INVENTION

According to this invention the acidic cation exchange resin containing alkali metal cations and alkanolamine cations is regenerated by eluting the resin with an aqueous ammonia solution to displace the alkanolamine from the resin with minimal displacement of alkali metal cations. This stream is further processed to separate ammonia and alkanolamine, both of which are reused in the process. Thereafter the resin is eluted with a weak mineral acid to displace the ammonia, metal cations and any remaining alkanolamine from the resin. Preferably the resin is washed with water before and after each of the elution steps.

In one aspect of the invention the basic anion exchange resin is not used. The alkanolamine solution containing free alkanolamine, alkali metal salts of heat stable acid anions and any remaining alkanolamine salts of such anions is brought in contact with an acidic cation exchange resin. In the process, the hydrogen ions on the resin are displaced with alkali metal cations and alkanolamine cations. In addition, free alkanolamine in the alkanolamine solution is protonated with hydrogen ions on the resin and becomes attached to the resin as alkanolamine cations. The acidic anions released from the alkali metal and alkanolamine salts react with the hydrogen released from the resin to form acids, which are removed from the system in the water wash which follows the contact step. Thereafter the procedure as previously described is followed, viz. elution of the cation resin with aqueous ammonia, followed by HCl elution, with appropriate water washes.

The regenerant from the ammonia elution step is introduced to the alkanolamine system upstream of the regeneration step where the ammonia is recovered by condensation and can be reused in the cation resin regeneration process. The alkanolamine from the ammonia elution step is reused in the sweetening process.

BRIEF DESCRIPTION OF THE DRAWINGS

FIG. 3 is a schematic flow diagram which illustrates another embodiment of the invention.

DETAILED DESCRIPTION OF THE INVENTION

The process of the invention may be used to reactivate any spent aqueous alkanolamine solution which contains alkali metal salts of anions which form heat stable salts with alkanolamines. As previously pointed out, such spent alkanolamine solutions result usually from processes in which hydrocarbon gases are contacted with an aqueous alkanolamine solution to absorb such impurities as $H_2S$ and $CO_2$. The resulting solutions which contain alkanolamine salts of $H_2S$ and $CO_2$ also contain alkanolamine salts of various inorganic acidic anions which are present in the hydrogarbon gases, or are formed in the solution by oxidation resulting from oxygen entering the alkanolamine treating system. In addition to the inorganic acid anions, the alkanolamine solution may also be contaminated with organic anions such as anions of formic and acetic acid and the like. The alkanolamine salts of $H_2S$ and $CO_2$ are no theat stable and may readily be decomposed by steam stripping with the noncomittant removal of the released $H_2S$ and $CO_2$. The salts of the acid anions are unaffected by heat or steam stripping but may be converted from alkanolamine salts to alkali metal salts by introducing an alkali metal hydroxide to the alkanolamine solution. Any alkali metal hydroxide may be used for this purpose such as potassium hydroxide or lithium hydroxide, however, for economic reasons sodium hydroxide is preferred.

The process of this invention in which the alkali metal salts are removed to prevent buildup of these contaminants in the alkanolamine treating solution and alkanolamine is recovered in the regeneration of the acidic cation exchange resin is best described by reference to the drawings.

Figure 1:
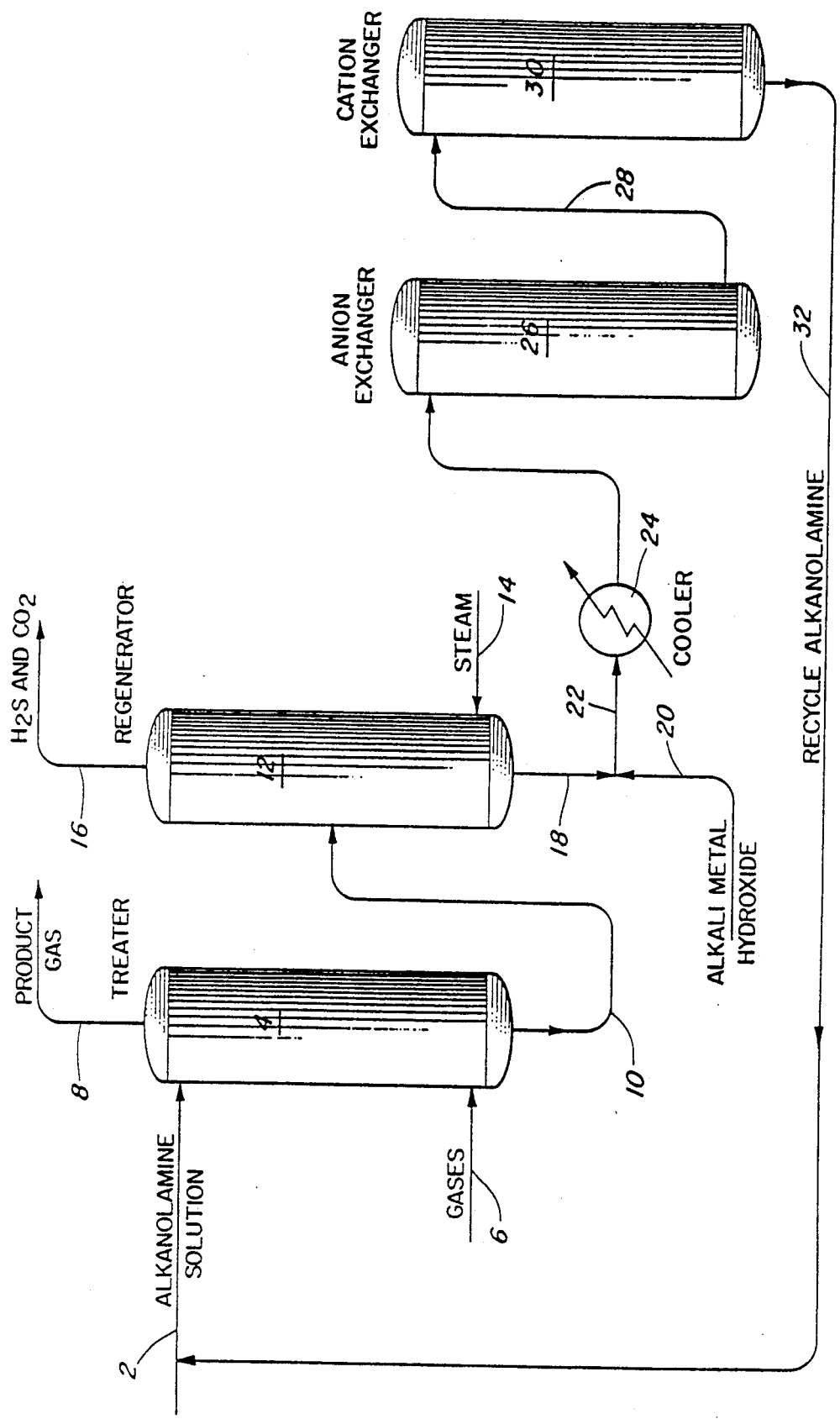
FIG. 1 is a schematic flow diagram which illustrates one embodiment of the invention.

Referring to FIG. 1, a gas containing undesirable hydrogen sulfide and carbon dioxide is introduced to a countercurrent treating zone 4 through line 6. The gas flows upwardly through treater 4 and contacts downflowing alkanolamine, in this instance, ethanolamine solution which is introduced to the top of the treater through line 2. The temperature in the treater is usually maintained in the range of between about 90 and about 130° F. while the pressure varies from between about 0 and about 1700 psig.

A product gas substantially free from hydrogen sulfide and carbon dioxide is withdrawn from the top of the treater via line 8. Ethanolamine solution containing absorbed hydrogen sulfide and carbon dioxide as salts of ethanolamine is removed from the treater through line 10 and introduced to regenerator 12. Steam introduced to the bottom of the regenerator through line 14 passes upward through the ethanolamine solution providing heat to decompose the hydrogen sulfide and carbon dioxide salts and strip them from the ethanolamine solution. A mixture of steam, hydrogen sulfide, and carbon dioxide is then removed overhead from the regenerator through line 16.

As pointed out previously, the feed gases introduced to the system in addition to hydrogen sulfide and carbon dioxide contain various acids and acidic gases which react with the ethanolamine to form heat stable ethanolamine salts. These salts being unaffected by the steam introduced to regenerator 12 pass along with the alkanolamine solution from the bottom of the regenerator through line 18.

An alkali metal hydroxide solution, in this instance, sodium hydroxide having a concentration in the range of about 5 weight percent to about 30 weight percent and preferably in the range from about 10 weight percent to 20 weight percent is combined with the ethanolamine solution through line 20. The sodium hydroxide reacts with the anions of the ethanolamine salts thereby releasing the ethanolamine and forming sodium salts of these heat stable salt anions. The ethanolamine solution containing sodium salts and any unreacted amine salts passes through line 22 into a cooler 24 where the solution is reduced in temperature to between about 90° F. and about 105° F. to protect the ion exchange material contained in exchangers 26 and 30. After cooling, the mixture is introduced to anion exchanger 26 which contains a basic anionic exchange resin. In the anion exchanger, hydroxide ions attached to the cationic sites on the resin are displaced by the various anions contained in the sodium salts and in the alkanolamine salts. The ethanolamine solution then leaves the anion exchanger and passes to the cation exchanger through line 28. In the cation exchanger which contains an acidic cationic resin, hydrogen ions at the anionic sites on the resin are displaced by sodium cations and by alkanolamine cations. In addition, free alkanolamine is protonated by hydrogen on the resin to form alkanolamine cations which also are retained at the anionic sites. The hydrogen ions then combine with the hydroxide ions already contained in the amine solution to form water. The ethanolamine solution is now free of sodium salts and, after stripping (not shown) to remove excess water, can be recycled to the gas treating system through line 32.

Sodium ions are removed from the ethanolamine solution to maintain the heat stable salt anion removal capability in the anion exchanger. If sodium is allowed to remain in solution, hydroxide ions which are exchanged for other anions will also remain in solution. Hydroxide ions then will react with dissolved hydrogen sulfide or carbon dioxide to form bisulfide or bicarbonate ions which will be associated with the sodium ions in solution. These anions will then displace the hydroxide ions on the anion exchange resin and take up sites which are needed for non-regenerable salt anion removal. Replacing the sodium ions with hydrogen ions allows the hydrogen and hydroxide ions to react to form water.

Figure 2:
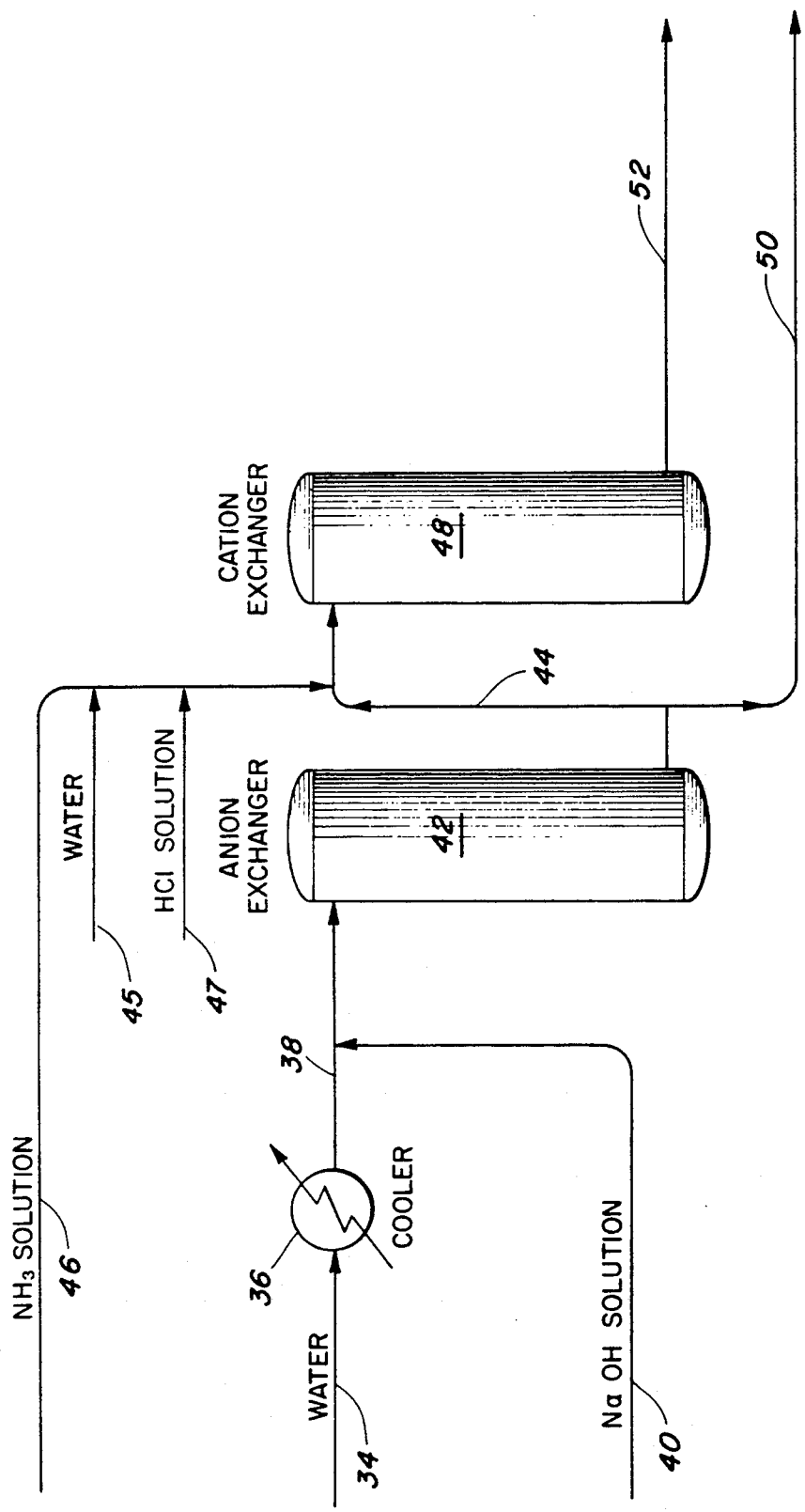
FIG. 2 is a schematic flow diagram which illustrates regeneration of the anion and cation exchange resins.

Periodically, exchange resins which have been used to remove alkali metal salts from spent aqueous alkanolamine solutions will require regeneration. A procedure for regenerating an anion and cation exchanger is illustrated in FIG. 2. To initiate this procedure flow of ethanolamine solution to the exchangers is halted and water is introduced to the system through line 34. In order to protect the ion exchange materials, the water is cooled in cooler 36 and introduced through line 38 to anion exchanger 42. From there the water is passed to cation exchanger 48 and is removed from the unit through line 52. The purpose of the water is to flush the exchangers of all free ethanolamine. If desired, the water containing ethanolamine may be combined with the ethanolamine stream leaving regenerator 12. After the ethanolamine is flushed from the ion exchange resin beds, the two beds are switched from series flow to parallel flow. The anion exchanger is then eluted with a sodium hydroxide stream containing from about 10 to about 15 weight percent sodium hydroxide which is introduced to anion exchanger 42 through lines 40 and 38, and exits the exchanger via line 50. Introduction of the sodium hydroxide is continued until the heat stable salt anions in the anion exchanger have been replaced with hydroxide ions. The cation exchanger 48 is eluted with an aqueous ammonia solution containing from about 10 to about 15 weight percent $NH_3$ which is introduced to this exchanger through line 46 and exits through line 52. The ammonia preferentially displaces the ethanolamine from the cation exchanger, leaving substantially all of the alkali metal cations in place. The displaced ethanolamine plus ammonia is introduced to the ethanolamine system where the ethanolamine is reused and the ammonia is separated for reuse, as described later in the discussion of FIG. 3.

After the ammonia treatment cation exchanger 48 is washed with water introduced through line 45 and removed therefrom through line 52 to remove residual free ammonia and ethanolamine. Cation exchanger 48 is then eluted with a dilute hydrochloric acid solution containing from about 10 to about 15 weight percent HCl which is introduced to this exchanger through line 47 and exits therefrom through line 52. The exiting solution contains ammonia, sodium cations and a small amount of alkanolamine. Flow of the HCl solution is continued until the sodium cations in the ion exchange resin have been replaced with hydrogen ions. Except as noted, the streams exiting the exchangers through lines 50 and 52 are normally sent to waste water treating. After elution the two beds are washed with water to remove any residual materials after which they are returned to service.

The use of aqueous ammonia to preferentially displace alkanolamine from the cation exchange resin makes it possible to eliminate the anion exchange resin from the alkanolamine treating process. The cation exchange resin then becomes the only resin used in the process. Use of a cation exchange resin as the sole resin in the process is illustrated in FIG. 3.

Referring to FIG. 3, spent ethanolamine solution containing heat stable sodium salts, ethanolamine salts and free ethanolamine is introduced to cation exchanger 56 through line 54. As the solution passes through the exchanger, the ethanolamine and sodium cations become attached to the negative charge sites on the exchange resin displacing hydrogen from the sites. In addition, free ethanolamine in the solution is protonated by hydrogen on the negative charge sites and is attached to the resin as ethanolamine cation. The acids which result from the reaction of displaced hydrogen with the heat stable salt anions, and water exit the cation exchanger through lines 58 and 80, are neutralized with caustic introduced through line 82 and are disposed of to a waste treatment system (not shown).

When ethanolamine breaks through the outlet of cation exchanger 56, the flow of ethanolamine solution is stopped and an aqueous ammonia solution is introduced to the cation exchanger through line 77. As the ammonia passes through the exchanger, it displaces the ethanolamine from the cation resin leaving the sodium behind. The displaced ethanolamine and aqueous ammonia are removed from the cation exchanger through line 58 and introduced to the amine recovery vessel 60. In this vessel, ammonia and water are vaporized, removed overhead through line 68 and passed through condensor 70 where they are condensed and deposited in accumulator 72. A portion of the condensed material is returned to amine recovery vessel 60 through line 74 as reflux. The remainder is taken from the unit through line 76 for reuse in the regeneration process. The heat required for vaporization of the ammonia and water is provided by reboiling the bottom of vessel 60 with ethanolamine withdrawn through line 62, heated in steam heater 66 and returned to the vessel through line 64. Ethanolamine is also withdrawn from the system through line 62 and returned to the ethanolamine system for reuse in the treating process.

After all of the alkanolamine has been removed from the cation resin, exchanger 56 is washed with water introduced through line 78 to remove any residual ammonia and ethanolamine. The wash water plus residual materials is discharged through lines 58 and 80. The cation exchanger 56 is then contacted with dilute HCl introduced to the exchanger through line 80. The hydrogen ions in the HCl displace the ammonium and sodium cations attached to the negative charge sites of the resin. Effluent from the exchanger containing chloride salts of ammonia and sodium exits through lines 58 and 80. The effluent solution is treated with caustic, introduced through line 82 to neutralize the chloride salts. If desired, the ammonia can be stripped from the effluent and reused, or it may be disposed of in an incineration unit (not shown).

After all of the ammonia and sodium has been removed from the resin, the resin is water washed again, with water introduced through line 78, to remove residual HCl and chloride salts. This wash stream is removed from the exchanger through lines 58 and 80 for waste disposal. At this point, the regeneration is complete and the cation exchanger is available for treatment of additional ethanolamine solution containing heat stable salts.

The invention has been specifically described in its application to the use of ethanolamine, however, any of the other common alkanolamines previously mentioned may be used in the process. The alkali metal base used to convert the alkanolamine heat stable salts to alkali metal salts is preferably sodium hydroxide, however, as mentioned previously other alkali metal hydroxides, such as potassium hydroxide may also be employed. The aqueous ammonia solution used in the process may vary in concentration; however, usually the ammonia will constitute between about 5 weight percent and about 25 weight percent of the solution and perferably between about 10 and about 15 weight percent. Of the mineral acids which may be used to displace the ammonia and alkali metal from the exchange resin, hydrochloric acid is preferred, however, other mineral acids, such as sulfuric acid or nitric acid may be employed. Dilute concentrations of acid are desirable; usually the acid strength will be between about 5 weight percent and about 25 weight percent acid and perferably between about 10 and about 15 weight percent.

As described, the ion exchange treating systems provided herein can be used to remove heat stable salts of alkanolamines as well as sodium salts of heat stable salt anions. The heat stable salts may be present due to incomplete reaction of the sodium hydroxide with such salts or they maybe contained in waste amine solutions which also require treatment to recover the amine for further use. Waste amines are generated from purging the circulating system, amine collected from upsets in the circulating system or other contaminated amines. Removing the heat stable salts and sodium salts of heat stable salt anions reduces foaming losses, corrosion, and maximizes the active alkanolamine concentration. Heat stable salt removal from waste amine solutions allows the active amine in the waste solutions to reenter the circulating amine solution without causing additional foaming, corrosion or amine deactivation problems. Also, the cost of makeup amine is reduced by returning the waste amine to service in the system.

A variety of basic and acidic ion exchange resins may be used in the process of the invention. Included are such materials as Mobay M500, a strong base anion exchange resin, which is a polystyrene resin with quaternary ammonium groups attached to the polymer framework; Rohm and Haas Amberlyst A-26, a strong base anion exchange resin, which is a styrene/divinyl benzene copolymer with quaternary ammonium groups attached to the polymer framework; Rohm and Haas Amberlite IRC-50, a weak acid cation exchange resin, which is a methacrylic acid/divinyl benzene copolymer with carboxylic acid functional groups attached to the polymer framework; Rohm and Haas Amberlyst A-15, a strong acid cation exchange resin, which is a styrene/divinyl benzene copolymer resin with sulfonic acid groups attached to the polymer framework; and Rohm and Haas Amberlite IR-120, a strong acid cation exchange resin, which is a sulfonic styrene-divinyl benzene copolymer and Rohm and Haas Amberlite IRA-410, a strong base amine-type anion exchange resin. Also included are Dow styrene-divinyl benzene strong base anion exchange resins having quaternary amines as their functional group. These materials are available under the DOWEX trademark. The preceding are merely illustrative of the useful ion exchange resins and are not intended to limit the resins which may be used in carrying out the invention.

The process of the invention has been described in conjunction with a batch operation where the flow of aqueous alkanolamine is halted while the basic anion exchange resin undergoes regeneration. The process may also be carried out continuously by providing a plurality of resin exchangers, with appropriate piping and valves.

The following examples are presented in illustration of the invention.

EXAMPLE 1

A column of 575 gm of Rohm and Haas IRC-50 cation resin was placed in a 2.5"×26" plastic column. The resin was conditioned with 2 liters of 5 weight percent HCl in water. The column was then rinsed with deionized water. A similar column with Rohm and Haas A-26 anion resin was regenerated to the hydroxide form.

Next 2 liters of an aqueous solution of containing 468 gm of MDEA (methyldiethanolamine) and 26.4 gm of Na was run through the anion column and then the cation column. The columns were rinsed in series with deionized water. The rinse effluent contained 437 gm of MDEA and no $Na^+$.

The cation column was then flushed with 2 liters of an aqueous 5 weight percent ammonia solution. After adding ammonia, the column was rinsed with 3 liters of deionized water. The eluents from these steps were analyzed for both MDEA and $Na^+$ content. The total concentration of $Na^+$ in the eluents was zero and the MDEA content was 31.0 gm.

A 2 liter wash of 5 weight percent HCl in water was then passed through the cation column followed by 3 liter of deionized water. The eluent from the column was analyzed for MDEA and $Na+$. The total concentration of MDEA in the eluent was less than 0.001 weight parcent and the total amount of $Na+$ was 26.4 gm.

The example demonstrates that the ammonia regeneration step effected almost completely recovery of the MDEA from the cation exchange resin, with minimal removal of sodium cation. It also allowed removal of the sodium contaminant from the resin without significant loss of MDEA.

EXAMPLE 2

A ¾" glass column containing 50 g of Dow IRC-50 cation exchange resin in the $H^+$ form was charged with a 42.5 g sample of methyldiethanolamine (MDEA) solution containing:

| | |
|---|---|
| MDEA | 15.5 grams |
| Acetate | 0.97 grams |
| Formate | 0.68 grams |
| Thiocyanate | 1.03 grams |
| Chloride | 0.048 grams |
| Sulfate | 0.069 grams |
| Sodium | 1.18 grams |

The column was washed with 250 ml of deionized water and 50 ml samples were collected for analysis.

Next, the column was eluted with 200 ml of 10% Ammonia to remove the amine.

Then 75 ml of 15% Sulfuric acid was eluted to reprotonate the resin for the next run.

The process was repeated with 16 g of the same amine solution charged to the same column. The results of tests are shown in Tables 1 and 2.

TABLE 1

| Sample | MDEA | OAC$^-$ | HCO$_2^-$ | SCN$^-$ | Cl$^-$ | SO$_4^=$ | Na$^+$ |
|---|---|---|---|---|---|---|---|
| E-1-C-1* | 3.68 g | 0.34 g | 0.25 g | 0.31 g | 0.015 g | 0.026 g | 0.070 g |
| 2 | 2.69 | 0.37 | 0.27 | 0.35 | 0.015 | 0.019 | 0.106 |
| 3 | 1.62 | 0.21 | 0.16 | 0.12 | 0.008 | 0.011 | 0.071 |
| 4 | 0.38 | 0.01 | — | — | — | — | — |
| 5 | 0.25 | — | — | — | — | — | — |
| 6 | 0.21 | — | — | — | — | — | — |
| 7 | 0.16 | — | — | — | — | — | — |
| Totals NH$_3$ | 9.00 g | 0.93 g | 0.68 g | 0.78 g | 0.038 g | 0.056 g | 0.247 g |
| R-1-C-1** | 6.04 g | — | — | — | — | — | — |
| H$_2$SO$_4$ R-1-C-2 | — | — | — | — | — | — | 0.695 g |
| Totals | 15.04 g | 0.93 g | 0.68 g | 0.78 g | 0.038 g | 0.056 g | 0.942 g |
| Added | 15.50 g | 0.97 g | 0.68 g | 1.03 g | 0.048 g | 0.069 g | 1.18 g |
| % Recovery | 97.0 | 96.0 | 100.0 | 75.7 | 79.2 | 81.1 | 79.8 |

% of Clean Amine Recovery in NH$_3$ Rinse $\frac{6.04}{15.50} \times 100 = 39\%$

*Experiment-1-Cut-1
**Rinse-1-Cut-1

TABLE 2

| Sample | MDEA | OAC$^-$ | HCO$_2^-$ | SCN$^-$ | Cl$^-$ | SO$_4^=$ | Na$^+$ |
|---|---|---|---|---|---|---|---|
| E-2-C-1* | 0.91 g | 0.15 g | 0.10 g | 0.11 g | 0.007 g | 0.012 g | 0.04 g |
| 2 | 1.00 | 0.18 | 0.15 | 0.10 | 0.006 | 0.011 | 0.05 |
| 3 | 0.24 | 0.04 | 0.04 | 0.03 | — | — | 0.02 |
| 4 | — | — | — | — | — | — | — |
| 5 | — | — | — | — | — | — | — |
| Totals NH$_3$ | 2.15 g | 0.37 g | 0.29 g | 0.24 g | 0.013 g | 0.23 g | 0.11 g |
| R-2-C-1** | 3.79 | — | — | — | — | — | — |
| H$_2$SO$_4$ R-2-C-2 | — | — | — | — | — | — | 0.28 g |
| Totals | 5.94 g | 0.37 g | 0.29 g | 0.24 g | 0.013 g | 0.023 g | 0.39 g |
| Added | 5.82 g | 0.37 g | 0.26 g | 0.39 g | 0.018 g | 0.026 g | 0.44 g |
| % Recovery | 102.0*** | 100.0 | 111.0*** | 61.0 | 72.0 | 88.0 | 89.0 |

% of Clean Amine Recovery in NH$_3$ Rinse $\frac{3.79}{5.82} \times 100 = 65\%$

*Experiment-2-Cut-1
**Rinse-2-Cut-1
***The column used contained resin which had previously been contacted with MDEA. Apparently the last regeneration of the column before the runs in this example failed to remove all of these materials.

In section of Tables 1 and 2 show that the amine is preferentially removed from the cation resin in the ammonia elution step. The ammonia solution containing MDEA is easily distilled and concentrated to eliminate the water and ammonia, allowing the MDEA to be recycled to the process. After about 8 to 10 exhaustion and regeneration cycles, the resin is cleaned with warm (100 to 150° F.) 10 to 20 percent sulfuric acid to remove any sodium build up on the resin.

While certain embodiments and details have been shown for the purpose of illustrating the present invention, it will be apparent to those skilled int his art that various changes and modifications may be made herein without departing from the spirit or scope of the invention.

We claim:

1. A process for regenerating an acidic cation exchange resin containing alkali metal cations and alkanolamine cations at the ionic sites on the resin, which comprises:

(a) eluting the resin with aqueous ammonia solution to displace the alkanolamines from the resin with minimal displacement of alkali metal cations, (b) thereafter eluting the resin with a weak solution of mineral acid to displace the ammonia, metal cations and any remaining alkanolamine from the resin.

2. The process of claim 1 in which the resin is water washed prior to and after steps (a) and (b).

3. The process of claim 1 in which the alkanolamine cation is selected from the group consisting of cations of protonated ethanolamine, diethanolamine, methyldiethanolamine, diisopropanolamine and triethanolamine.

4. The process of claim 3 in which the alkali metal cation is sodium cation.

5. The process of claim 4 in which the mineral acid is HCl.

6. The process of claim 4 in which the mineral acid is sulfuric acid.

7. The process of claim 1 in which the eluent from step (a) which is a mixture of alkanolamine, ammonia and water is heated to vaporize ammonia and water, the vapor is separated from the liquid alkanolamine, condensed and at least part of the condensate is reused in step (a).

8. In a process in which:

(a) an aqueous alkanolamine solution is contacted with a gas containing hydrogen sulfide, carbon dioxide and inorganic acids and acid gases whereby the alkanolamine reacts with the hydrogen sulfide and carbon dioxide to form heat decomposable salts and with the inorganic acids and acid gases to form heat stable alkanolamine salts, (b) he alkanolamine salts of hydrogen sulfide and carbon dioxide contained in the alkanolamine solution are decomposed by heating to recover the hydrogen sulfide and carbon dioxide, (c) heat stable alkanolamine salts of the inorganic acids and acid gases are converted to alkali metal stales by reaction with an alkali metal hydroxide, (d) the alkanolamine solution containing alkali metal stalts, any unreacted alkanolamine salts and free alkanolamine is contacted with an acidic cation exchange resin to remove alkali metal cations and alkanolamine cations resulting from (1) protonation of the free alkanolamine with hydrogen on the resin and (2) the alkanolamine salts, the improvement which comprises:

(e) eluting the resin with aqueous ammonia solution to displace the alkanolamine from the resin with minimal displacement of alakli metal cations, (f) thereafter eluting the resin with a dilute mineral acid to displace the ammonia, metal cations and any remaining alkanolamine from the resin.

9. The process of claim 8 in which the resin is water washed after steps (d), (e) and (f).

10. The process of claim 8 in which the alkanolamine cation is selected from the group consisting of cations of ethanolamine, diethanolamine, methyldiethanolamine, diisopropanolamine and triethanolamine.

11. The process of claim 10 in which the alkali metal cation is sodium cation.

12. The process of claim 11 in which the mineral acid is HCl.

13. The process of claim 11 in which the mineral acid is sulfuric acid.

14. The process of claim 8 in which the eluent from step (e) which is a mixture of alkanolamine, ammonia and water is heated to vaporize ammonia and water, the vapor is separated from the liquid alkanolamine, condensed and at least part of the condensate is reused in step (e).

15. In a process in which:

(a) an aqueous alkanolamine solution is contacted with a gas containing hydrogen sulfide, carbon dioxide and inorganic acids and acid gases whereby the alkanolamine reacts with the hydrogen sulfide and carbon dioxide to form heat decomposable salts and with the inorganic acids and acid gases to form heat stable alkanolamine salts, (b) the alkanolamine salts of hydrogen sulfide and carbon dioxide contained in the alkanolamine solution are decomposed by heating to recover the hydrogen sulfide and carbon dioxide, (c) heat stable alkanolamine salts of the inorganic acids and acid gases are converted to alkali metal salts by reaction with an alkali metal hydroxide, (d) the alkanolamine solution containing alkali metal salts, any unreacted alkanolamine slats and free alkanolamine is contacted with a basic anion exchange resin to remove anions from the alkali metal salts and alkanolamine salts, (e) the alkanol solution is then contacted with an acidic cation exchange resin to remove alkali metal cations and alkanolamine cations resulting from (1) protonation of the free alkanolamine with hydrogen on the resin and (2) the alkanolamine salts, the improvement which comprises regenerating the acidic cation exchange resin by:

(f) eluting the resin with aqueous ammonia solution to displace the alkanolamine from the resin with minimal displacement of alkali metal cations, (g) thereafter eluting the resin with a dilute mineral acid to displace the ammonia, metal cations and any remaining alkanolamine for the resin.

16. The process of claim 15 in which the resin is water washed after steps (d), (e) and (f).

17. The process of claim 15 in which the alkanolamine cation is selected from the group consisting of cations of ethanolamine, diethanolamine, methyldiethanolamine, diisopropanolamine and triethanolamine.

18. The process of claim 17 in which the alkali metal cation is sodium cation.

19. The process of claim 18 in which the mineral acid is HCl.

20. The process of claim 18 in which the mineral acid is sulfuric acid.

21. The process of claim 15 in which the eluent from step (f) which is a mixture of alkanolamine, ammonia and water is heated to vaporize ammonia and water, the vapor is separate from the liquid alkanolamine, condensed and at least part of the condensate is reused in step (f).

22. A process which comprises:

(a) contacting a bed of acidic cation exchange resin with a flowing alkanolamine solution containing free alkanolamine, alkali metal salts of acid anions and heat stable alkanolamine salts of acid anions whereby alkali metal cations and alkanolamine cations resulting from (1) protonation of the free alkanolamine with hydrogen on the resin and (32) the alkanolamine salts are removed from the solution.

(b) terminating the flow of alkanolamine solution to the bed of acid cation exchange resin when alkanolamine breaks through the bed, (c) water washing the resin bed to remove acid anions released from the alkali metal salts and alkanolamine salts, (d) eluting the washed bed of resin with aqueous ammonia to preferentially remove alkanolamine from the resin, (e) again water washing the eluted bed to remove residual ammonia and alkanolamine from the resin, (f) eluting the wash bed of resin with a dilute mineral acid to displace the ammonia, metal cation and any remaining alkanolamine from the resin, (g) again water washing the bed of resin to remove residual ammonia and metal salts and alkanolamine.

23. The process of claim 22 in which the recited steps are carried out with downward flow.

24. The process of claim 22 in which the eluent from step (d) which is a mixture of alkanolamine, ammonia and water is heated to vaporize ammonia and water, the vapor is separated from the liquid alkanolamine which is reused in sep (a), and the ammonia and water vapor is condensed and at least part of the condensate is reused in step (d).

* * * * *

UNITED STATES PATENT AND TRADEMARK OFFICE
CERTIFICATE OF CORRECTION

PATENT NO. : 5,006,258
DATED : April 9, 1991
INVENTOR(S) : Fred C. Veatch et al

It is certified that error appears in the above-identified patent and that said Letters Patent is hereby corrected as shown below:

Column 1, line 31, "HS" should be --$H_2S$--
Column 1, line 49, "SCN" should be --$SCN^-$--
Column 2, line 18, "slats" should be --salts--
Column 3, line 58, "no theat" should be --not heat--
Column 8, line 23, "Na" should be --$Na^+$--

Column 11, line 3 "he" should be --the--
Column 11, line 20, "alakli" should be ---alkali-
Column 12, line 36 "(32)" should be --(2)--

Signed and Sealed this

Eighth Day of September, 1992

Attest:

DOUGLAS B. COMER

Attesting Officer

Acting Commissioner of Patents and Trademarks